(12) United States Patent
Xu et al.

(10) Patent No.: US 10,906,138 B2
(45) Date of Patent: Feb. 2, 2021

(54) MOLD SURFACE REPAIRING PROCESS

(71) Applicant: CITIC Dicastal CO., LTD., Hebei (CN)

(72) Inventors: Zuo Xu, Qinhuangdao (CN); Shixiang Zou, Qinhuangdao (CN); Wenqi Yang, Qinhuangdao (CN); Zhiliang Zhang, Qinhuangdao (CN); Hongkun Wang, Qinhuangdao (CN); Huanming Ma, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 37 days.

(21) Appl. No.: 16/257,192

(22) Filed: Jan. 25, 2019

(65) Prior Publication Data

US 2020/0009692 A1    Jan. 9, 2020

(30) Foreign Application Priority Data

Jul. 3, 2018 (CN) .......................... 2018 1 0711220

(51) Int. Cl.
 *B23P 6/04* (2006.01)
 *B29C 33/74* (2006.01)

(52) U.S. Cl.
 CPC .............. *B23P 6/04* (2013.01); *B29C 33/74* (2013.01)

(58) Field of Classification Search
 CPC ... B23P 6/04; B23P 6/00; B29C 33/74; B22C 9/06; B22C 9/18; B24B 19/26; B24B 1/00; B24C 1/086; B24C 1/00
 See application file for complete search history.

(56) References Cited

U.S. PATENT DOCUMENTS

| | | | | |
|---|---|---|---|---|
| 10,137,335 | B2 * | 11/2018 | Hope | ........................ B22C 7/02 |
| 2005/0020195 | A1 * | 1/2005 | Kao | ...................... B24B 41/002 451/61 |
| 2020/0057525 | A1 * | 2/2020 | Prest | ................... G06F 3/04883 |

FOREIGN PATENT DOCUMENTS

| CN | 105817832 A | 8/2016 |
|---|---|---|
| CN | 107127523 A | 9/2017 |
| CN | 107756694 A | 3/2018 |
| CN | 107805809 A | 3/2018 |

* cited by examiner

*Primary Examiner* — Rick K Chang
(74) *Attorney, Agent, or Firm* — Cooper Legal Group, LLC

(57) ABSTRACT

A mold surface repairing process, the process flow of which is as follows: first sand blasting—defect identification—repairing welding—coarse grinding—semi-finishing grinding—finishing grinding—secondary sand blasting—mold heating—spray paint. The disclosure provides a combination of automatic equipment, special grinding tools and finishing grinding process, which ensures the quality and efficiency of the mold repair and reduces the labor force.

1 Claim, 2 Drawing Sheets

MOLD SURFACE REPAIRING PROCESS

CROSS-REFERENCE TO RELATED APPLICATIONS

The present application claims benefit of China Application No. 201810711220.3, filed on Jul. 3, 2018, the contents of which are hereby incorporated by reference in its entirety.

TECHNICAL FIELD

The disclosure relates to a mold surface repairing process, in particular to a grinding process for maintaining or repairing a mold cavity surface.

BACKGROUND

In the field of aluminum alloy precision casting, especially in the field of aluminum alloy precision casting with high requirements for appearance quality, it is often necessary to carry out precise grinding and repairing on the surface of mold cavity corresponding to the characteristics. The original grinding process is fine grinding by holding oilstone in hands after coarse grinding with file, sandpaper and the like, which requires a lot of reciprocating action for a long time, and the labor intensity is extremely high, so that the work efficiency is low, the quality of surface grinding is difficult to guarantee, and even the product quality is affected.

SUMMARY

In view of the shortcomings of the above prior art, the disclosure provides a mold surface repairing process, which combines automation equipment, special grinding tools and fine grinding tools to ensure the quality and efficiency of the mold repair and reduce the labor force.

The technical solution adopted by the present disclosure to solve the technical problems thereof is as follows:

A mold surface repairing process is as follows: first sand blasting—defect identification—repairing welding—coarse grinding—semi-finishing grinding—finishing grinding—secondary sand blasting—mold heating—spray paint.

During the first sand blasting, the part of the off-machine mold that need to be repaired is continuously impacted with high-speed fine steel sand inside the sandblasting machine, so that the coatings and sticky aluminum on the surface are removed, and a uniform diffuse reflection surface is formed on the surface of the mold cavity.

During the defect identification, the surface of the mold cavity is polished overall with sandpaper, so that the human eyes can identify defects, such as corrosion points, depressions, protrusions and cracks, according to the brightness difference of each location.

During the repairing welding, in the area with relatively large defects, the defective part is filled with argon arc welding, so that the defective area is slightly higher than the surface size required by the drawings.

During the coarse grinding, the damaged surface is quickly shaped and polished with a grinder provided with a brown corundum grinding wheel;

During the semi-finishing grinding, the cavity surface is quickly polished and grinded with a grinder provided with a rubber polishing head.

During the finishing grinding, the cavity surface is finely grinded with an oilstone to meet the appearance requirements, wherein the finishing grinding operation can be carried out with a special mold grinding tool which uses the oilstone sandwiched by a reciprocating pneumatic file, and the surface is grinded by the cross grinding process to prevent the occurrence of strip defects or bump defects.

During the secondary sand blasting, the sand blasting operation is carried out before the spray paint, so that the cavity surface is uniform and rough, thereby increasing the surface adhesion thereof.

The repairing welding step is only used for the locations with low requirements for appearance quality but frequent defects, such as the gate area.

The disclosure provides a combination of automatic equipment, special grinding tools and finishing grinding process, which ensures the quality and efficiency of the mold repair and reduces the labor force.

List of reference symbols: 1. mold; 2. defective area filled with argon arc welding

DETAILED DESCRIPTION

The present disclosure will be further described in detail below with reference to the embodiments and the accompanying drawings.

Figure 1:
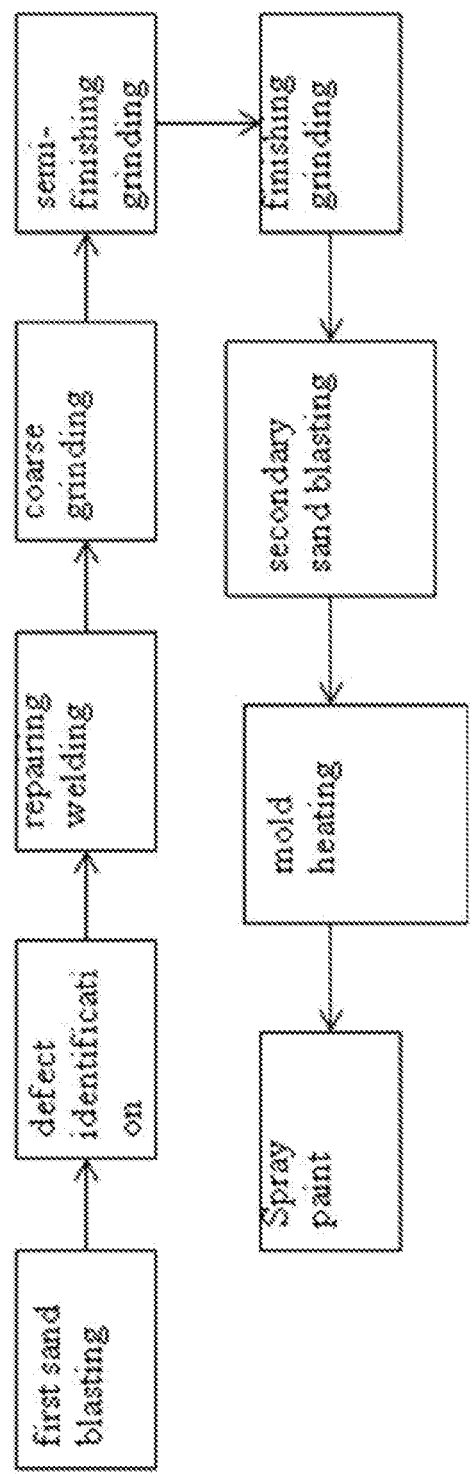
FIG. 1 is a flow chart of mold cavity surface repairing process.
Figure 2:
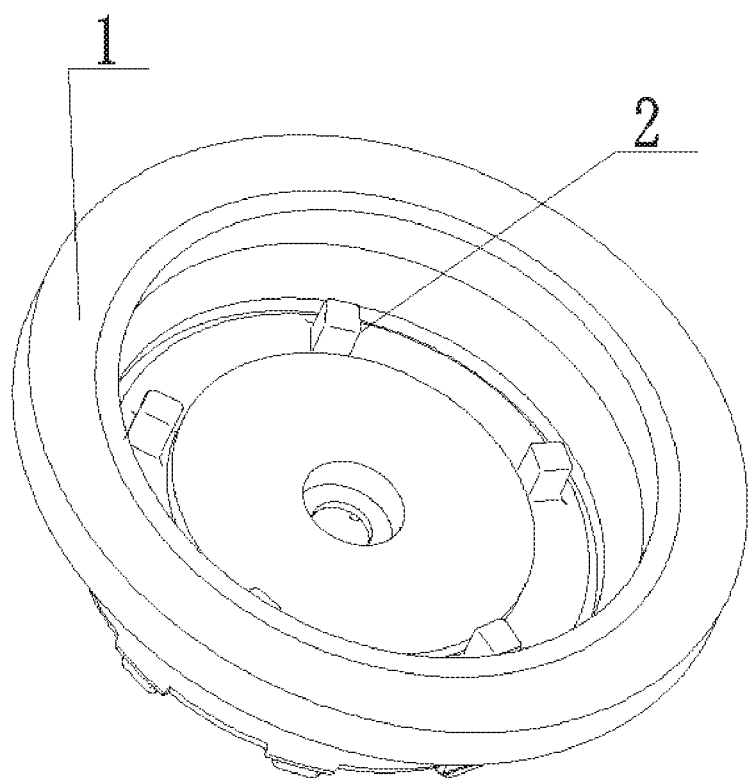
FIG. 2 shows a mold and defective areas of the mold cavity having defects filled with argon arc welding.

As shown in FIG. 1, a mold surface repairing process is as follows: first sand blasting—defect identification—repairing welding—coarse grinding—semi-finishing grinding—finishing grinding—secondary sand blasting—mold heating—spray paint.

During the first sand blasting, the part of the off-machine mold 1 that need to be repaired is continuously impacted with high-speed fine steel sand inside the sandblasting machine, so that the coatings and sticky aluminum on the surface are removed, and a uniform diffuse reflection surface is formed on the surface of the mold cavity.

During the defect identification, the surface of the mold cavity is polished overall with sandpaper, so that the human eyes can identify defects, such as corrosion points, depressions, protrusions and cracks, according to the brightness difference of each location.

During the repairing welding, in the area 2 with relatively large defects, the defective part is filled with argon arc welding, so that the defective area is slightly higher than the surface size required by the drawings.

During the coarse grinding, the damaged surface is quickly shaped and polished with a grinder provided with a brown corundum grinding wheel;

During the semi-finishing grinding, the cavity surface is quickly polished and grinded with a grinder provided with a rubber polishing head.

During the finishing grinding, the cavity surface is finely grinded with an oilstone to meet the appearance requirements, wherein the finishing grinding operation can be carried out with a special mold grinding tool which uses the oilstone sandwiched by a reciprocating pneumatic file, and the surface is grinded by the cross grinding process to prevent the occurrence of strip defects or bump defects.

During the secondary sand blasting, the sand blasting operation is carried out before the spray paint, so that the cavity surface is uniform and rough, thereby increasing the surface adhesion thereof.

The invention claimed is:

1. A method for repairing a mold surface of a mold, wherein the method successively comprises: a first sand blasting step, a defect identification step, a repairing welding step, a first grinding step, a second grinding step, a third grinding step, a second sand blasting step, and a spray paint step;

during the first sand blasting step, a part of the mold that needs to be repaired is continuously impacted with steel sand inside a sandblasting machine, so that coatings and aluminum on a surface of a mold cavity are removed, and a diffuse reflection surface is formed on the surface of the mold cavity;

during the defect identification step, the surface of the mold cavity is polished overall with sandpaper, so that human eyes can identify a defective area of the mold cavity having defects of corrosion points, depressions, protrusions or cracks, according to a brightness of each area of the surface of the mold cavity;

during the repairing welding step, the defective area of the mold cavity having the defects is filled with argon arc welding;

during the first grinding step, the surface of the mold cavity is shaped and polished with a grinder provided with a brown corundum grinding wheel;

during the second grinding step, the surface of the mold cavity is polished and grinded with a grinder provided with a rubber polishing head;

during the third grinding step, the surface of the mold cavity is grinded with an oilstone to meet appearance requirements, wherein the third grinding step is carried out with a mold grinding tool which uses the oilstone sandwiched by a reciprocating pneumatic file, and the surface of the mold cavity is grinded by a cross grinding process to prevent an occurrence of strip defects or bump defects; and during the second sand blasting step, a sand blasting operation is carried out before the spray paint step to increase a surface adhesion of the surface of the mold cavity.

* * * * *